United States Patent
Takahashi (10) Patent No.: US 8,948,760 B2
(45) Date of Patent: Feb. 3, 2015

(54) MOBILE TERMINAL, MOTION/STILLNESS DETERMINATION METHOD, AND PROGRAM

(75) Inventor: Makoto Takahashi, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 1 day.

(21) Appl. No.: 13/881,107

(22) PCT Filed: Jun. 27, 2012

(86) PCT No.: PCT/JP2012/066351
§ 371 (c)(1),
(2), (4) Date: Apr. 23, 2013

(87) PCT Pub. No.: WO2013/008622
PCT Pub. Date: Jan. 17, 2013

(65) Prior Publication Data
US 2013/0210440 A1    Aug. 15, 2013

(30) Foreign Application Priority Data
Jul. 11, 2011    (JP) .................................. 2011-153294

(51) Int. Cl.
*H04W 36/32*    (2009.01)
*H04W 64/00*    (2009.01)
*G01S 19/34*    (2010.01)

(52) U.S. Cl.
CPC ............ *H04W 36/32* (2013.01); *H04W 64/006* (2013.01); *G01S 19/34* (2013.01)
USPC .......................................... 455/436; 455/466

(58) Field of Classification Search
USPC ......... 455/456.1–457, 550.1, 556.1–557, 466
See application file for complete search history.

(56) References Cited

U.S. PATENT DOCUMENTS

| | | | | |
|---|---|---|---|---|
| 2005/0048977 | A1* | 3/2005 | Dorenbosch et al. | 455/441 |
| 2010/0113073 | A1* | 5/2010 | Schlesener et al. | 455/466 |
| 2010/0210301 | A1* | 8/2010 | Dietz et al. | 455/556.1 |
| 2012/0214513 | A1 | 8/2012 | Hashimoto et al. | |
| 2012/0258734 | A1* | 10/2012 | Takahashi et al. | 455/456.1 |

FOREIGN PATENT DOCUMENTS

| | | |
|---|---|---|
| JP | 2009 267886 | 11/2009 |
| JP | 2011 22115 | 2/2011 |
| WO | 2011 024540 | 3/2011 |

OTHER PUBLICATIONS

International Search Report Issued Aug. 28, 2012 in PCT/JP12/66351 Filed Jun. 27, 2012.

* cited by examiner

*Primary Examiner* — Kashif Siddiqui
(74) *Attorney, Agent, or Firm* — Oblon, Spivak, McClelland, Maier & Neustadt, L.L.P.

(57) ABSTRACT

A mobile terminal determines whether the mobile terminal is moving or stationary. The mobile terminal includes a motion acceleration detection unit that detects motion acceleration based on acceleration information of the mobile terminal, a serving cell information retrieving unit that retrieves information representing a serving cell, a serving cell information switching determination unit that determines whether the serving cell is switched, based on the information representing the serving cell, and a motion/stillness determination unit that determines, when the serving cell is determined to be switched, whether the mobile terminal is moved, based on whether the motion acceleration is detected.

4 Claims, 9 Drawing Sheets

MOBILE TERMINAL, MOTION/STILLNESS DETERMINATION METHOD, AND PROGRAM

TECHNICAL FIELD

The present invention relates to a mobile terminal.

BACKGROUND ART

A mobile terminal has been known which automatically performs positioning and which reports a measured location to a service provider. The mobile terminal may perform the positioning by using GPS. The service provider includes a content provider and a telecommunications carrier.

In order to achieve electric power saving, the mobile terminal detects a continuous walking state, and detects switching of a sector. Specifically, the mobile terminal detects the continuous walking state by an acceleration sensor, and the mobile terminal detects the switching of the sector by area information from a base station. By detecting the continuous walking state and the switching of the sector, a determination can be made as to whether the mobile terminal is moving or stationary. When the determination is made that the mobile terminal is moving, the mobile terminal performs positioning at every predetermined period, and reports a location to the service provider.

Regarding the mobile terminal, a technique has been known such that, for a case where the mobile terminal is not stationary but frequent retrieval of location information is not required, power consumption is reduced by lowering a frequency of retrieving location information (e.g., Patent Document 1).

RELATED ART DOCUMENT

Patent Document

Patent Document 1: Japanese Unexamined Patent Publication No. 2009-267886

SUMMARY OF THE INVENTION

Problem to be Solved by the Invention

A case is considered where a function is operating such that the function determines as to whether the mobile station is moving by switching of the sector.

Figure 1:
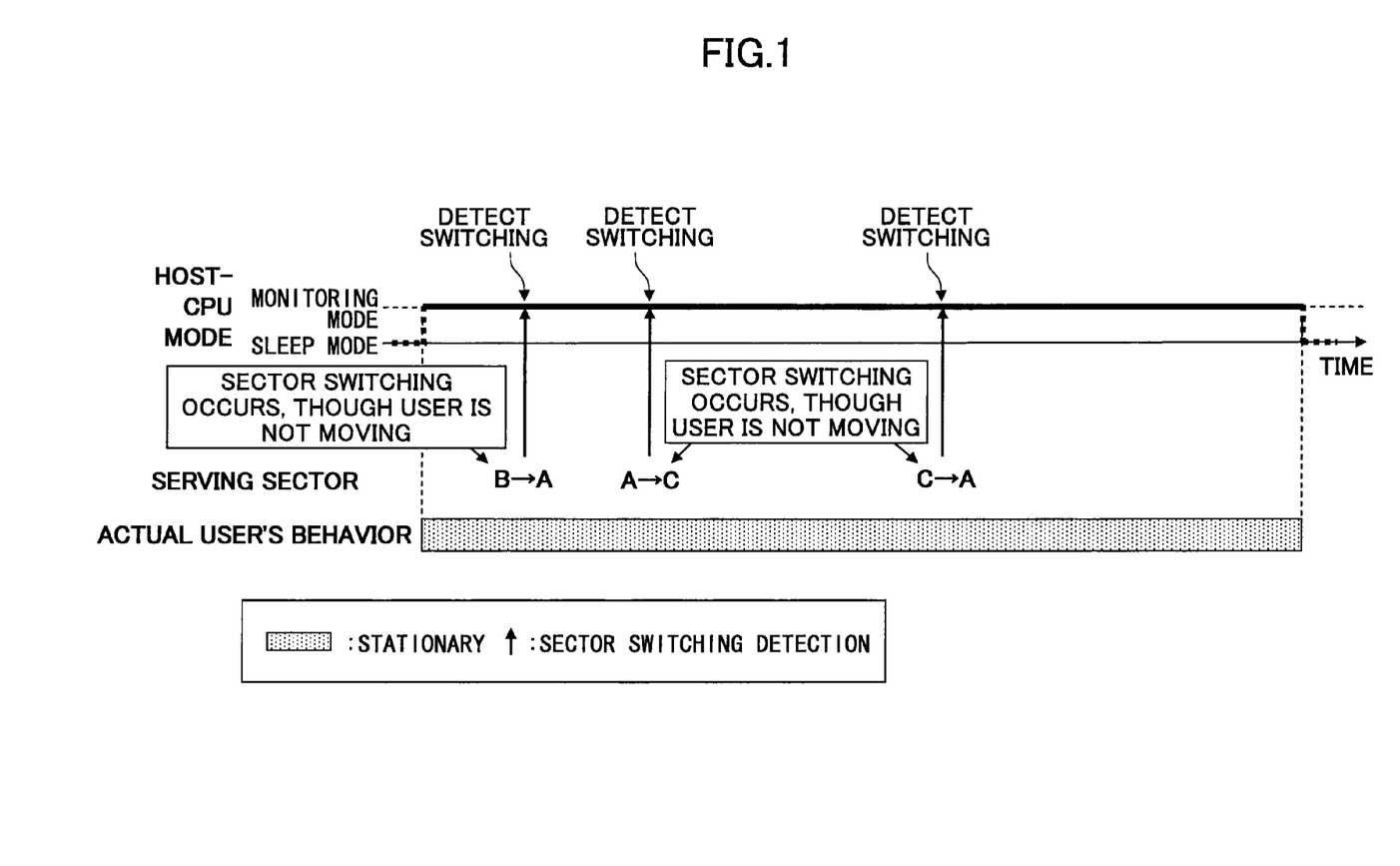
FIG. 1 is a diagram showing a process of determining motion or stillness in a mobile terminal (version 1)

FIG. 1 shows a process of determining motion or stillness in the mobile terminal (version 1).

In FIG. 1, a horizontal axis represents time. In a vertical axis, a Host-CPU mode, information representing a serving sector, and an actual user's behavior are shown.

As the Host-CPU mode, a monitoring mode is maintained. In the monitoring mode, a mobile terminal that is capable of detecting plural sectors having the equivalent radio quality may frequently switch a sector in an active state. The example of FIG. 1 shows a case where the serving sector is switched from B to A, from A to C, and from C to A, though the user is in a stationary state.

By the switching of the serving sector, an erroneous determination may be made that the user is in a moving state, though the user is in the stationary state.

There is a method, which is described below, for reducing the cases where such an erroneous determination is made by the switching of the serving sector that the user is in a moving state, though the user is in the stationary state.

Figure 2:
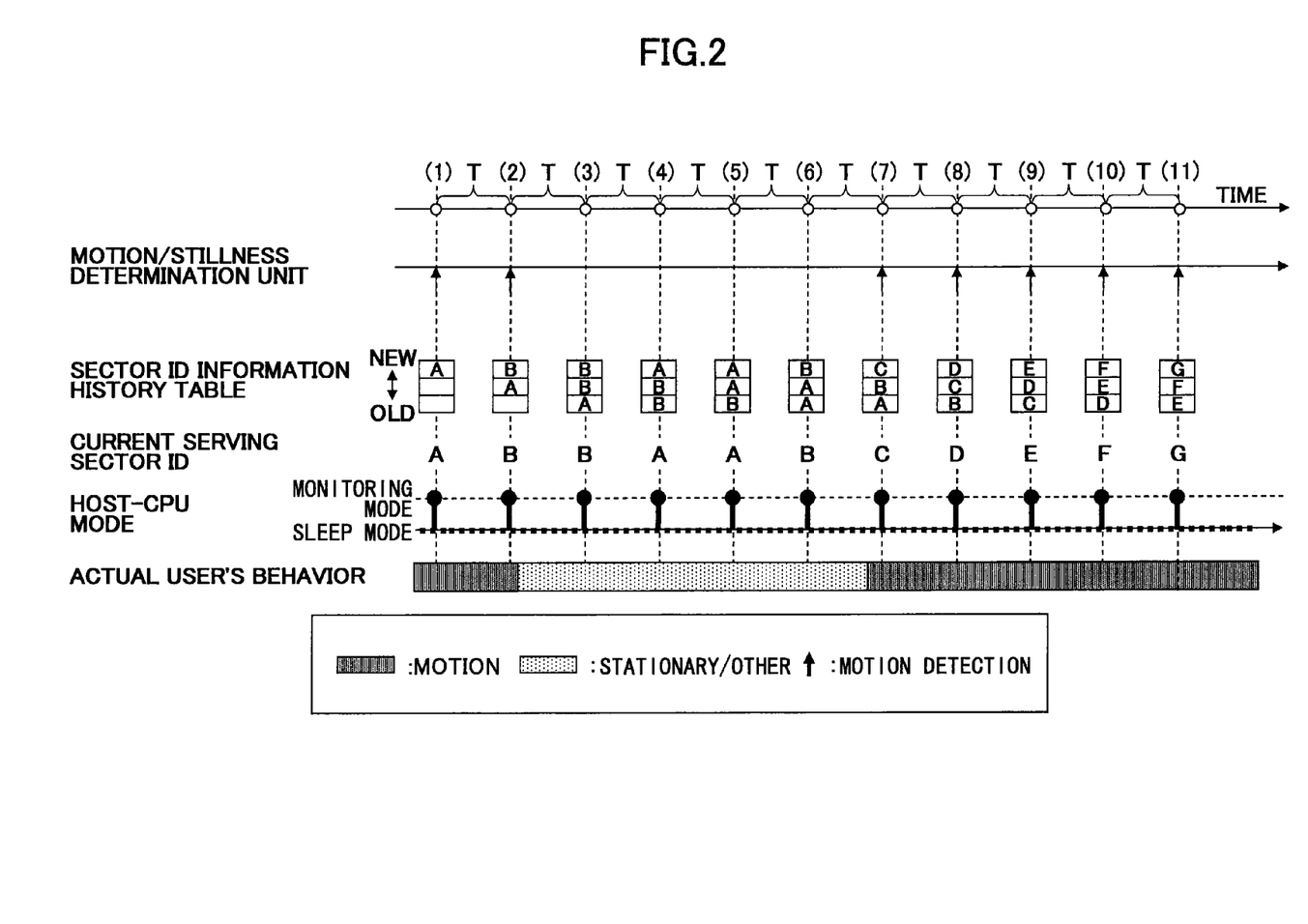
FIG. 2 is a diagram showing a process of determining motion or stillness in the mobile terminal (version 2)

FIG. 2 shows a process of determining motion or stillness in the mobile terminal (version 2).

In FIG. 2, the horizontal axis represents time. In the vertical axis, there are shown a motion/stillness determination unit that includes a function to determine motion or stillness, a sector ID information history table, the Host-CPU mode, and the actual user's behavior.

The mobile terminal includes a periodic timer. The periodic timer expires after a time period T is elapsed. At every time period T at which the periodic timer expires, the mobile terminal determines whether the mobile terminal is moving or stationary.

When the periodic timer expires and a determination is made as to whether the mobile station is moving or stationary, the mobile terminal refers to a table that records previous serving sectors up to the last one. In the example shown in FIG. 2, the past three serving sectors are recorded. When the table includes a sector ID that is the same as that of the current serving sector, a determination is made that it is "stationary," even if the sector ID is different from a sector ID which has been retrieved last time.

It is explained concretely.

At time (1), the Host-CPU mode transitions from a sleep mode to the monitoring mode, and "A" is obtained as a current serving sector ID. The Host-CPU mode transitions from the monitoring mode to the sleep mode. The motion/stillness determination unit refers to a sector ID information history table. When there is no information representing the sector ID which is the same as the retrieved current serving sector ID, a determination is made that it is moving. At the time (1), since there is no information representing the sector ID that is the same as that of the retrieved current serving sector "A" in the sector ID information history table, a determination is made that it is moving. The information representing the current serving sector is stored in the sector ID information history table.

At time (2), the Host-CPU mode transitions from the sleep mode to the monitoring mode, and "B" is retrieved as the current serving sector ID. The Host-CPU mode transitions from the monitoring mode to the sleep mode. Since there is no information representing the sector ID that is the same as the retrieved current serving sector "B," the motion/stillness determination unit determines that it is moving. The information representing the current serving sector ID is stored in the sector ID information history table.

At time (3), the Host-CPU mode transitions from the sleep mode to the monitoring mode, and "B" is obtained as the current serving sector ID. The Host-CPU mode transitions from the monitoring mode to the sleep mode. Since there is the information representing the sector ID that is the same as the retrieved current serving sector "B" in the sector ID information history table, the motion/stillness determination unit determines that it is stationary. The information representing the current serving sector ID is stored in the sector ID information history table.

At time (4), the Host-CPU mode transitions from the sleep mode to the monitoring mode, and "A" is obtained as the current serving sector ID. The Host-CPU mode transitions from the monitoring mode to the sleep mode. Since there is the information representing the sector ID that is the same as the retrieved current serving sector "A" in the sector ID information history table, the motion/stillness determination unit determines that it is stationary. The information representing the current serving sector ID is stored in the sector ID information history table.

At time (5), the Host-CPU mode transitions from the sleep mode to the monitoring mode, and "A" is obtained as the current serving sector ID. The Host-CPU mode transitions from the monitoring mode to the sleep mode. Since there is the information representing the sector ID that is the same as the retrieved current serving sector "A" in the sector ID information history table, the motion/stillness determination unit determines that it is stationary. The information representing the current serving sector ID is stored in the sector ID information history table.

At time (6), the Host-CPU mode transitions from the sleep mode to the monitoring mode, and "B" is obtained as the current serving sector ID. The Host-CPU mode transitions from the monitoring mode to the sleep mode. Since there is the information representing the sector ID that is the same as the retrieved current serving sector "B" in the sector ID information history table, the motion/stillness determination unit determines that it is stationary. The information representing the current serving sector ID is stored in the sector ID information history table.

At time (7), the Host-CPU mode transitions from the sleep mode to the monitoring mode, and "C" is obtained as the current serving sector ID. The Host-CPU mode transitions from the monitoring mode to the sleep mode. Since there is no information representing the sector ID that is the same as the retrieved current serving sector "C" in the sector ID information history table, the motion/stillness determination unit determines that it is moving. The information representing the current serving sector ID is stored in the sector ID information history table.

At time (8), the Host-CPU mode transitions from the sleep mode to the monitoring mode, and "D" is obtained as the current serving sector ID. The Host-CPU mode transitions from the monitoring mode to the sleep mode. Since there is no information representing the sector ID that is the same as the retrieved current serving sector "D" in the sector ID information history table, the motion/stillness determination unit determines that it is moving. The information representing the current serving sector ID is stored in the sector ID information history table.

At time (9), the Host-CPU mode transitions from the sleep mode to the monitoring mode, and "E" is obtained as the current serving sector ID. The Host-CPU mode transitions from the monitoring mode to the sleep mode. Since there is no information representing the sector ID that is the same as the retrieved current serving sector "E" in the sector ID information history table, the motion/stillness determination unit determines that it is moving. The information representing the current serving sector ID is stored in the sector ID information history table.

At time (10), the Host-CPU mode transitions from the sleep mode to the monitoring mode, and "F" is obtained as the current serving sector ID. The Host-CPU mode transitions from the monitoring mode to the sleep mode. Since there is no information representing the sector ID that is the same as the retrieved current serving sector "F" in the sector ID information history table, the motion/stillness determination unit determines that it is moving. The information representing the current serving sector ID is stored in the sector ID information history table.

At time (11), the Host-CPU mode transitions from the sleep mode to the monitoring mode, and "G" is obtained as the current serving sector ID. The Host-CPU mode transitions from the monitoring mode to the sleep mode. Since there is no information representing the sector ID that is the same as the retrieved current serving sector "G" in the sector ID information history table, the motion/stillness determination unit determines that it is moving. The information representing the current serving sector ID is stored in the sector ID information history table.

By this method, when the plural sectors having the equivalent radio quality are detected, an erroneous determination can be avoided, which is caused by the frequent switching of the sector in the active state. Here, the erroneous determination is such that a determination is made that it is moving, though it is stationary. However, it is not determined whether the sector in the active state is frequently switching or the mobile station is moving to the sector where the mobile station was served last time. Namely, when the mobile terminal moves to the sector where the mobile terminal was served last time, a determination should be made that it is moving. However, in the above-described method, it is possible that a determination is erroneously made.

The present invention has been achieved in view of the above-described point. An object of the present invention is to provide a technique that can reduce erroneous determinations as to whether it is moving.

Means for Solving the Problem

In order to solve the above-described problem, the mobile terminal according to the present invention is achieved as a mobile terminal that determines whether the mobile terminal is moving. The mobile terminal includes a motion acceleration detection unit that detects motion acceleration based on acceleration information of the mobile terminal; a serving cell information retrieving unit that retrieves information representing a serving cell; a serving cell information switching determination unit that determines whether the serving cell is switched, based on the information representing the serving cell, wherein the information representing the serving cell is retrieved by the serving cell information retrieving unit; and a motion/stillness determination unit that determines, when the serving cell information switching determination unit determines that the serving cell is switched, whether the mobile terminal is moved, based on whether the motion acceleration is detected by the motion acceleration detection unit.

It may be configured such that the motion acceleration detection unit detects the motion acceleration at every first period, the serving cell information switching determination unit determines whether the serving cell is switched at every second period, wherein the second period is greater than the first period, and the motion/stillness determination unit determines, when the serving cell information switching determination unit determines that the serving cell is switched, whether the mobile terminal is moved, based on whether the motion acceleration is detected by the motion acceleration detection unit, subsequent to a preceding process of determining whether the serving cell is switched.

It may be configured such that, when the serving cell information switching determination unit determines that the serving cell is switched, and when the motion acceleration detection unit detects the motion acceleration subsequent to the preceding process of determining whether the serving cell is switched, the motion/stillness determination unit determines that the mobile terminal is moved.

Further, it may be configured as a motion/stillness determination method and a program to be executed by the mobile station.

Effect of the Present Invention

According to the disclosed mobile terminal, the technique can be provided which reduces the erroneous determinations as to whether it is moving.

EMBODIMENTS FOR CARRYING OUT THE INVENTION

Hereinafter, an embodiment is explained based on figures. In all the figures for explaining the embodiment, the same reference numerals are used for entities having the same functions, and thereby overlapped explanations are omitted.

Embodiment

Radio Communication System

Figure 3:
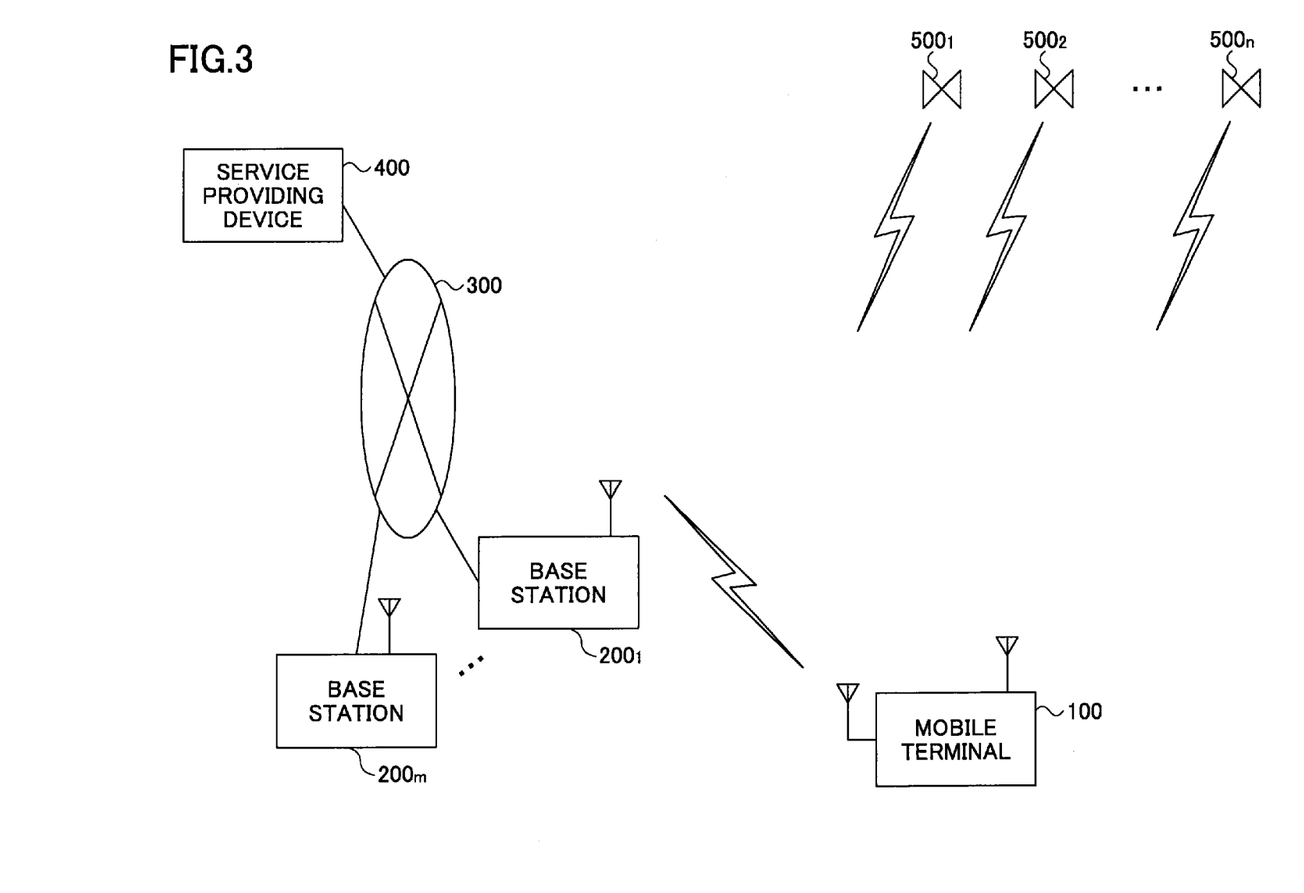
FIG. 3 is a diagram showing one embodiment of a radio communication system.

FIG. 3 shows one embodiment of a radio communication system.

The radio communication system includes a base station $200_m$ (m is an integer such that m>0). The base station $200_m$ may be referred to as a "base unit," an "access point," or a "station," for example. FIG. 3 shows a case where m=2, as an example. The base station $200_m$ covers a cell. The base station $200_m$ broadcasts area information. By receiving the area information, a mobile terminal 100 can retrieve information representing a serving cell. Further, the base station $200_m$ may cover plural sectors. When the base station $200_m$ covers the plural sectors, the area information includes information representing the sectors. By receiving the area information, the mobile terminal 100 can retrieve the information representing a serving sector. In the embodiment, the explanation is given while assuming that a cell includes a sector. The cell may be distinguished from the sector.

The radio communication system includes GPS satellites $500_1$-$500_n$ (n is an integer such that n>3). The GPS satellites $500_1$-$500_n$ transmits positioning signals.

The radio communication system includes the mobile terminal 100. The mobile terminal 100 determines whether the mobile terminal 100 is moving, based on whether the detected base station $200_m$ is switched. The mobile terminal 100 may be any suitable terminal, with which a user can perform communication. Examples of the mobile terminal 100 include a mobile telephone, an information terminal, a personal digital assistant, and a mobile personal computer. However, the mobile terminal 100 is not limited to these.

An application is installed in the mobile terminal 100. The user can activate and utilize the application. The application includes an application that utilizes a positioning result by the mobile terminal 100 of a location. The mobile terminal 100, in which the application that utilizes the positioning result is installed, periodically performs automatic positioning, and the mobile terminal 100 reports the positioning result to a service providing device 400.

The mobile terminal 100 is wirelessly connected to the base station $200_m$. The base station $200_m$ is connected to a communication network 300. The base station $200_m$ and the communication network 300 may be connected through a wire, or wirelessly connected. For a case of a wired connection, a connection may be made by an optical line. Further, the service providing device 400 is connected to the communication network 300. The service providing device 400 provides a service to the mobile terminal 100. Depending on a result of positioning of a location from the mobile terminal 100, the service providing device 400 provides a service depending on the location to the mobile terminal 100. For example, based on the location information of the user, the service providing device 400 transmits weather information of a neighboring area of the location or information regarding an event which is held in the neighboring area of the location by a push operation. The mobile terminal 100 can retrieve the weather information of the neighboring area and the information regarding the event which is held in the neighboring area of the location, where the weather information and the information regarding the event are transmitted by the push operation. Further, for example, based on the location information of the user, the service providing device 400 transmits last train information for a station in a neighboring area of the location by the push operation. The mobile terminal 100 can retrieve the last train information for the station in the neighboring area of the location, which is transmitted by the push operation.

<Mobile Terminal>

Figure 4:
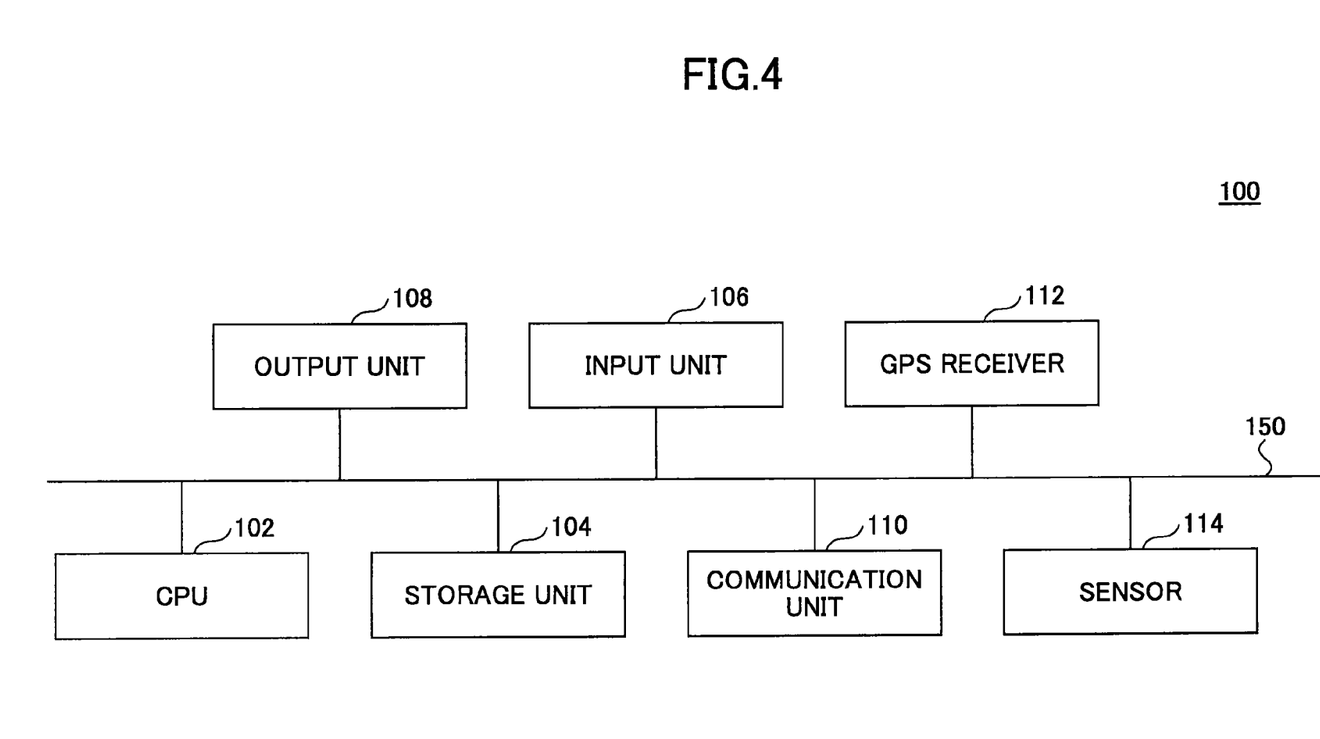
FIG. 4 is a diagram showing one embodiment of the mobile terminal.

FIG. 4 shows one embodiment of the mobile terminal 100. FIG. 4 mainly shows a hardware configuration.

The mobile terminal 100 includes a central processing unit (CPU) 102; a storage unit 104; an input unit 106; an output unit 108; a communication unit 110; a Global Positioning System (GPS) receiver 112; and a sensor 114. These functional blocks are connected through a bus 150.

The CPU 102 performs control of the storage unit 104, the input unit 106, the output unit 108, the communication unit 110, the GPS receiver 112, and the sensor 114. The CPU 102 functions and performs predetermined operations in accordance with a program which is stored in the storage unit 104.

The storage unit 104 includes an application and an operating system (OS: Operating System). The application is software which has a function to execute a task. Here, the task is performed on the mobile terminal 100 by the user. The operating system is software that provides an interface, which abstracts hardware, to application software in the mobile terminal 100. Further, the storage unit 104 stores a program. The program operates when the mobile terminal 100 is caused to function. The program includes a motion/stillness determination program that operates for determining whether the mobile terminal 100 is moving or stationary.

The input unit 106 includes a keyboard and a mouse, for example. The input unit 106 is a device for inputting a command and data. It may include a touch panel. For a case where the touch panel is included, inputting of the command and the data to the mobile terminal 100 is performed through the touch panel. The command includes a command for the operating system and a command for the application.

The output unit includes a display, for example. The output unit 108 displays a processing state and a processing result by the mobile terminal 100. The processing state and the processing result include those of the operating system and those of the application. The display includes a liquid crystal display, a cathode ray tube (CRT) display, a plasma display panel (PDP) display, and an organic electro-luminescence (EL) display, for example.

The communication unit 110 performs radio communication with the base station 200 in accordance with a predetermined radio communication scheme, under the control of the CPU 102. The radio communication scheme may include the Wide band CDMA (W-CDMA) scheme and the Long Term Evolution (LTE) scheme. The communication unit 110 inputs information regarding the cell which is serving for the mobile terminal 100 to the CPU 102. For example, when the serving cell is switched, the communication unit 110 may input information representing a cell which is the destination of the switching. Further, the information representing the serving cell may be reported at every predetermined period.

The GPS receiver 112 performs positioning of a location of the mobile terminal 100, in accordance with a control signal (a positioning command) which is input by the CPU 102. For example, the GPS receiver 112 performs the positioning of the GPS receiver 112, based on the positioning signals transmitted by the GPS satellites $500_1$-$500_n$ (n is an integer such that n>3). The positioning is performed in accordance with time intervals at which the positioning is to be performed. Specifically, a distance (a pseudo distance) from each of the plural GPS satellites $500_1$-$500_n$ to the GPS receiver 112 is calculated. The GPS receiver 112 performs positioning of the mobile terminal 100 including the GPS receiver 112, based on the pseudo distances. The location information may be expressed by a longitude and a latitude. Signals emitted from the corresponding GPS satellites $500_1$-$500_n$ reach the GPS receiver 112 while the signals are delayed by corresponding time periods elapsed for the radio waves to propagate the corresponding distances between the GPS satellites $500_1$-$500_n$ and the GPS receiver 112. Accordingly, by calculating the time periods required for propagation of the radio waves for the plural GPS satellites $500_1$-$500_n$, the location of the GPS receiver 112 can be obtained by a positioning operation. For example, from the radio waves emitted from each of the plural GPS satellites $500_1$-$500_n$, the distance from each of the GPS satellites $500_1$-$500_n$ to the GPS receiver 112 is obtained by a distance measurement unit of the GPS receiver 112. Then, by a positioning processing unit, the location of the GPS receiver 112 is obtained, based on the distances obtained by the distance measurement unit. The GPS receiver 112 inputs the location information to the CPU 102. Currently, approximately thirty GPS satellites are orbiting around the earth at an altitude of approximately 20,000 km. There are six orbital surfaces around the earth, and the six orbital surfaces are inclined by 55 degrees relative to each other. Four or more GPS satellites are evenly spaced on each of the orbital surfaces. Therefore, at least five GPS satellites can be observed from any place on the earth, provided that the sky above the place is opened.

The GPS receiver 112 outputs the location information obtained by the positioning. For example, the GPS receiver 112 transmits the location information from the communication unit 100 to the service providing device 400.

The sensor 114 includes a sensor which is capable of obtaining information for determining whether the user holding the mobile terminal 100 is moving. For example, the sensor 114 includes an acceleration sensor.

<Functions of Mobile Terminal 100>

The mobile terminal 100 determines whether the mobile terminal 100 is moving or stationary. Hereinafter, the process by the mobile terminal 100 of determining whether it is moving or stationary is referred to as the "motion/stillness determination process." When the determination is made that the mobile terminal 100 is moving, the mobile terminal 100 performs automatic positioning at every predetermined period, and the mobile terminal 100 reports the measured location to the service providing device 400.

Figure 5:
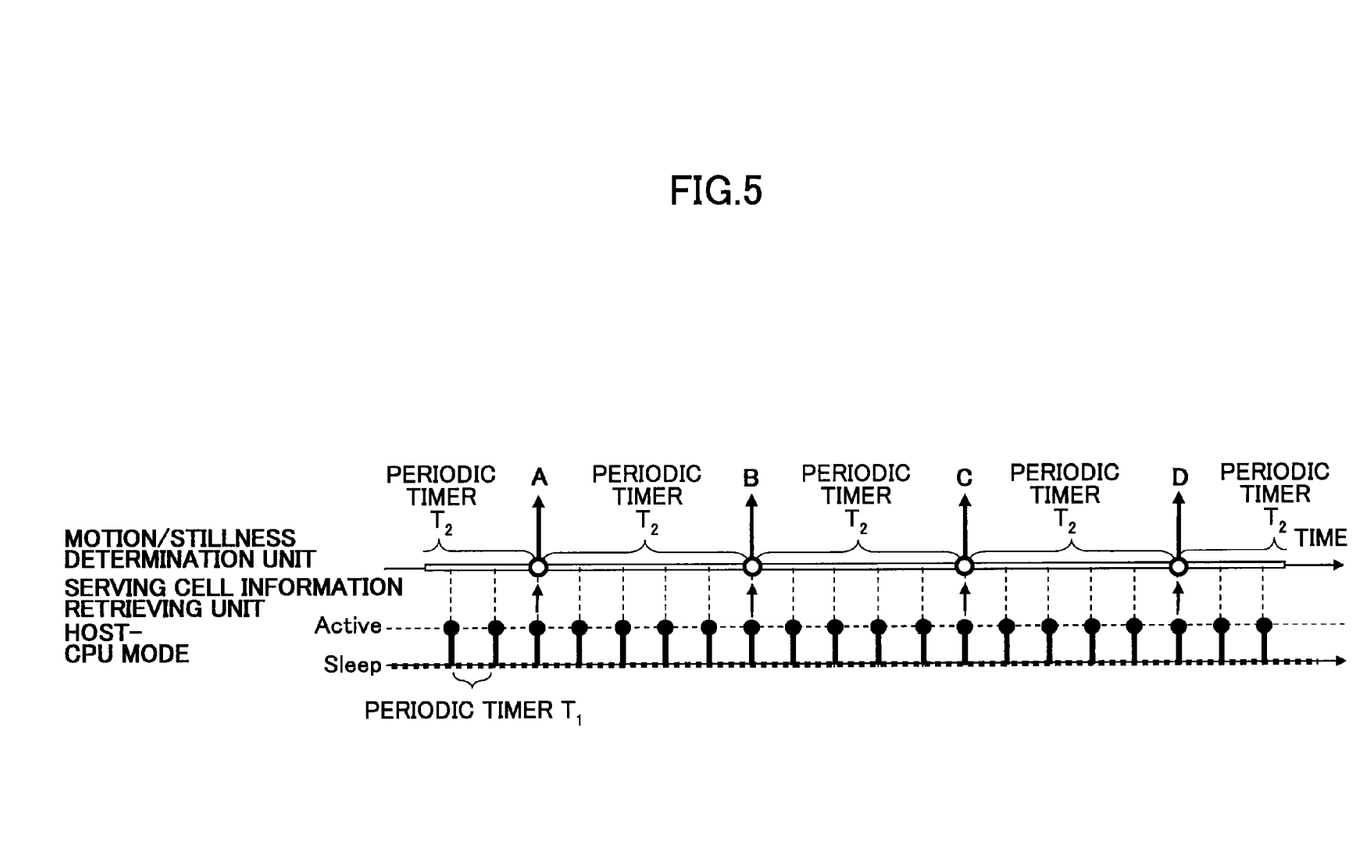
FIG. 5 is a diagram showing one embodiment of operations of the mobile terminal.

FIG. 5 shows the motion/stillness determination process performed by the mobile terminal 100.

In FIG. 5, the horizontal axis represents time. In the vertical axis, there are shown operations of a motion/stillness determination unit having a function for determining whether the mobile terminal 100 is moving or stationary. Further, in the vertical axis, there are shown operations of a serving cell information retrieving unit having a function of retrieving information representing the serving cell. Further, in the vertical axis, there are shown the current serving sector ID and the Host-CPU mode.

The mobile terminal 100 transitions from a sleep mode to an active mode at every predetermined period $T_1$. When the mobile terminal 100 transitions to the active mode, the mobile terminal 100 retrieves acceleration information of the mobile terminal 100. The mobile terminal 100 detects motion acceleration, based on the acceleration information. The mobile terminal 100 determines whether the serving sector is switched at every predetermined period $T_2$. The mobile terminal 100 performs the motion/stillness determination process, based on a determination result of whether the serving sector is switched. The predetermined period $T_1$ is smaller than the predetermined period $T_2$. The predetermined period $T_2$ can be an integral multiple of the predetermined period $T_1$. That is because it is preferable to determine whether the mobile terminal 100 is moving or stationary based on plural pieces of acceleration information, from a perspective of precision. Namely, it is preferable that $\alpha T_1 = T_2$ ($\alpha$ is an integer such that $\alpha$>0) be satisfied. FIG. 5 shows a case where $\alpha$=5, as an example. Here, $\alpha$ may be an integer which is greater than or equal to 1 and less than or equal to 4, or $\alpha$ may be an integer which is greater than or equal to 6.

When the mobile terminal 100 performs the motion/stillness determination process, the mobile terminal 100 determines whether motion acceleration is detected, based on the motion acceleration obtained in a time period from the preceding motion/stillness determination process to the present motion/stillness determination process. In the time period from the preceding motion/stillness determination process to the present motion/stillness determination process, the information is retrieved which represents whether the motion acceleration is detected once or plural times. When the motion acceleration is detected and the serving cell is switched in the time period from the preceding motion/stillness determination process to the present motion/stillness determination process, the mobile terminal 100 determines that it is moving. Namely, the mobile terminal 100 determines that it is moving for a case where the motion acceleration is detected and the serving cell is switched subsequent to the preceding motion/stillness determination process. It suffices if the motion acceleration is detected at least once. For a case where the motion acceleration is not detected subsequent to the preceding motion/stillness determination process, the mobile terminal 100 determines that it is stationary, even if the serving cell is switched.

When the mobile terminal 100 determines that it is moving, the mobile terminal 100 periodically performs automatic positioning, and reports the measured location to the service providing device 400. The motion/stillness determination process is performed in parallel with this process. When the determination is made that it is stationary by the motion/stillness determination process, the process of periodically performing automatic positioning and reporting the measured position to the service providing device 400 may be terminated.

Figure 6:
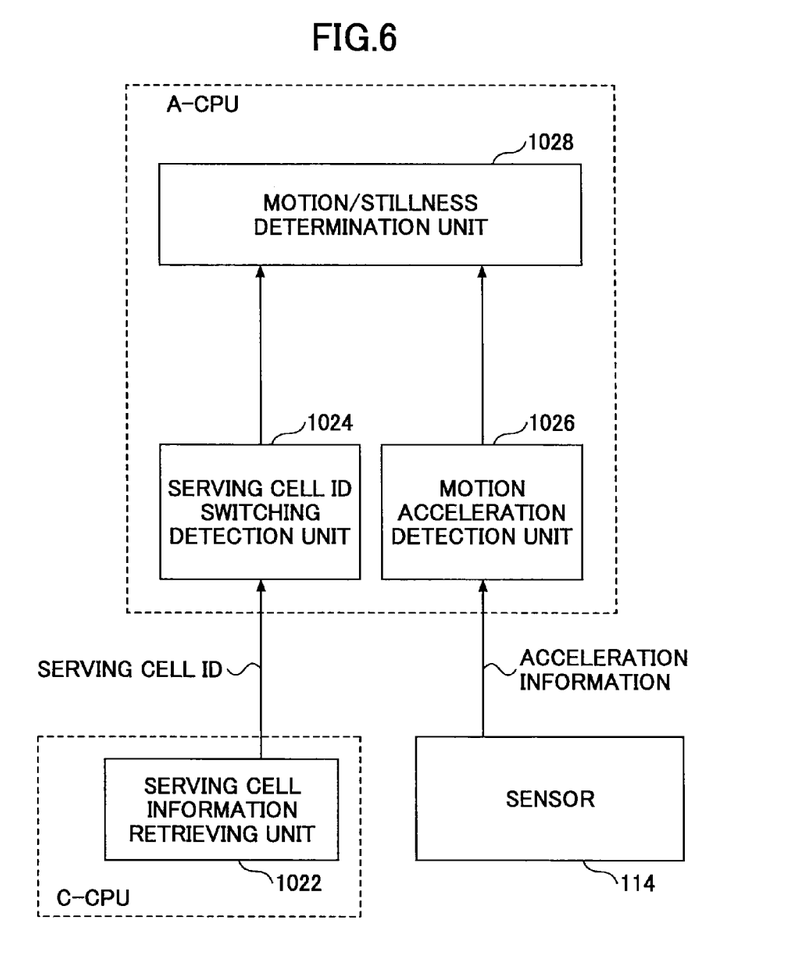
FIG. 6 is a functional block diagram showing one embodiment of the mobile terminal.

FIG. 6 is a functional block diagram showing functions of the mobile terminal 100. FIG. 6 mainly shows the functions executed by the CPU 102. Namely, these are executed by the CPU 102, where the CPU 102 functions in accordance with the motion/stillness determination program stored in the storage unit 104.

The mobile terminal 100 includes a serving cell information retrieving unit 1022; a serving cell ID switching detection unit 1024; a motion acceleration detection unit 1026; and a motion/stillness determination unit 1028.

The serving cell information retrieving unit 1022 retrieves information regarding the cell, which is serving for the mobile terminal 100. For example, when the mobile terminal 100 moves and performs a handover to a cell other than the serving cell, and thereby the serving cell is switched, the serving cell information retrieving unit 1022 may retrieve the information representing the serving cell (which is referred to as the "serving cell ID," hereinafter). Alternatively, the serving cell information retrieving unit 1022 may retrieve the serving cell ID at every predetermined period, which is defined in advance. The serving cell information retrieving unit 1022 inputs the serving cell ID to the serving cell ID switching detection unit 1024. In the embodiment, the serving cell information retrieving unit 1022 retrieves the serving cell ID at every time period $T_2$.

The serving cell ID switching detection unit 1024 is connected to the serving cell information retrieving unit 1022. The serving cell ID switching detection unit 1024 determines whether the serving cell ID is different from the serving cell ID which is input by the serving cell information retrieving unit 1022 for the preceding time, based on the serving cell ID which is to be input by the serving cell information retrieving unit 1022. The serving cell ID switching detection unit 1024 inputs information representing whether the serving cell ID which is input by the serving cell information retrieving unit 1022 for the previous time is different from the serving cell ID which is currently input (which is referred to as the "serving cell ID switching information," hereinafter) to the motion/stillness determination unit 1028. When the serving cell ID switching information is input to the motion/stillness determination unit 1028 for the case where setting is made so that the serving cell ID is retrieved at every predetermined period, the serving cell ID switching information may be input to the motion/stillness determination unit 1028 if the retrieved serving cell ID is changed (if the retrieved serving cell ID is different from the serving cell which is input for the preceding time).

When the serving cell ID is input by the serving cell information retrieving unit 1022, the cell ID switching detection unit 1024 may refer to a table which stores the serving cell IDs up to the preceding time (a serving cell ID information storage table). Specifically, a table may be prepared which stores serving cell IDs for the past three times. It may be a table which stores serving cell IDs for the past two times, or it may be a table which stores serving cell IDs for the past four times. It may have substantially the same configuration as that of the sector ID information history table of FIG. 2. In this case, a determination may be made as to whether the retrieved serving sector ID is new by storing the newest serving sector ID in the upper level. Alternatively, the determination as to whether the retrieved serving sector ID is new may be enabled by including information regarding the date and time of the retrieval in the serving sector ID.

The serving cell ID switching detection unit 1024 may determine that the serving cell ID is changed when the table does not include the serving cell ID which is the same as the current serving cell ID. Namely, when the table includes the serving cell ID which is the same as the current serving cell ID, the serving cell ID switching detection unit 1024 may determine that the serving cell ID is the same, even if the serving cell ID is different from the serving cell ID which is retrieved for the preceding time.

The sensor 114 determines whether the user holding the mobile terminal 100 is moving. For example, the sensor 114 obtains acceleration information. The sensor 114 inputs the acceleration information to the motion acceleration detection unit 1026. The motion acceleration detection unit 1026 is connected to the sensor 114. The motion acceleration detection unit 1026 detects the motion acceleration, based on the acceleration information from the sensor 114. Specifically, a determination is made as to whether the motion acceleration is detected, each time the acceleration information is input by the sensor 114. The motion acceleration detection unit 1026 stores information representing whether the motion acceleration is detected in a motion acceleration management table.

Figure 7:
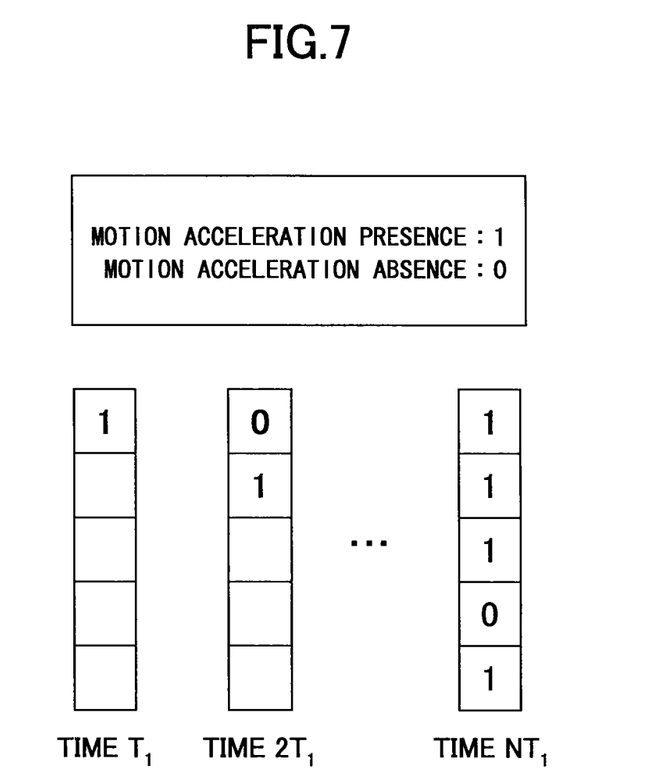
FIG. 7 is a diagram showing one embodiment of a motion acceleration management table.

FIG. 7 shows one embodiment of the motion acceleration management table. FIG. 7 shows an example where information representing whether the motion acceleration is detected is stored at every predetermined period $T_1$. In FIG. 7, "1" represents that the motion acceleration is detected, and "0" represents that the motion acceleration is not detected.

In the motion acceleration management table shown in FIG. 7, a determination result as to whether the motion acceleration is detected is recorded at every time period $T_1$. Specifically, "1" is recorded at the time period $T_1$. As described above, "1" represents that the motion acceleration is detected. At time period $T_2$, "0" is recorded subsequent to "1," which is recorded at the time period $T_1$. As described above, "0" represents that the motion acceleration is not detected. Subsequently, the similar process is continued. At time period $NT_1$ (N is an integer such that N>0), "1" is recorded subsequent to "1," "0," "1," and "1". The example shown in FIG. 7 is a case where N=5.

During execution of the motion/stillness determination process, the motion acceleration detection unit 1026 inputs information recorded in the motion acceleration management table (which is referred to as the "motion acceleration detection information," hereinafter) to the motion/stillness determination unit 1028.

The motion/stillness determination unit 1028 may include the motion acceleration management table. In this case, the motion acceleration detection unit 1026 may input a determination result to the motion/stillness determination unit 1028 each time the detection of the motion acceleration is performed. The motion/stillness determination unit 1028 causes the determination result by the motion/stillness determination unit 1028 of whether the motion acceleration is detected to be reflected in the motion acceleration management table.

The motion/stillness determination unit 1028 is connected to the serving cell ID switching detection unit 1024 and the motion acceleration detection unit 1026. The motion/stillness determination unit 1028 determines whether the serving cell ID switching information indicates that the serving cell ID is switched, based on the serving cell ID switching information from the serving cell ID switching detection unit 1024. When the serving cell ID switching information indicates that the serving cell ID is not switched, the motion/stillness determination unit determines that the mobile terminal 100 is stationary. In this case, the motion/stillness determination process is terminated.

When the serving cell ID switching information indicates that the serving cell ID is switched, the motion/stillness determination unit 1028 determines whether the motion acceleration is detected in the time period from the preceding motion/stillness determination process to the current motion/stillness determination process, based on motion acceleration detection information from the motion acceleration detection unit 1026. Namely, a determination is made as to whether the motion acceleration is detected subsequent to the preceding motion/stillness determination process. When a determination is made that the motion acceleration is detected, the motion/stillness determination unit 1028 determines that the serving cell ID is changed. In this case, a determination may be made that it is moving. Whereas, when a determination is made that the motion acceleration is not detected, the motion/stillness determination unit 1028 determines that the mobile terminal 100 is stationary. In this case, the motion/stillness determination process is terminated.

The mobile terminal 100 may include plural CPUs. For example, among the functions shown in FIG. 6, the serving cell retrieving unit 1022 may be executed by a communication-CPU (C-CPU). The C-CPU may include the above-described H-CPU. The C-CPU is a CPU for controlling the transmission system. For example, the C-CPU performs control of communication operations, such establishment and disconnection of connections with the base station and the switching center. Additionally, among the functions shown in FIG. 6, the serving cell ID switching detection unit 1024, the motion acceleration detection unit 1026, and the motion/stillness determination unit 1028 may be performed by an application-CPU (A-CPU). The A-CPU is a CPU for controlling an application system. For example, the A-CPU performs control of various application functions and a user interface.

<Operations of Mobile Terminal 100>
<Motion Acceleration Detection Process>

Figure 8:
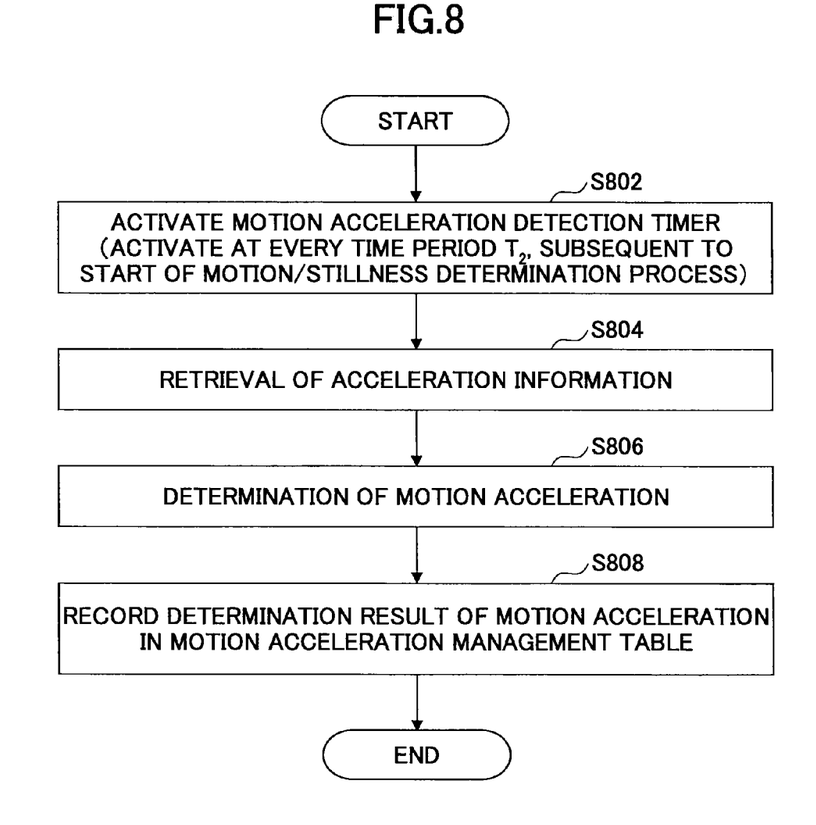
FIG. 8 is a flowchart showing one embodiment of operations of the mobile terminal (version 1)

FIG. 8 shows one embodiment of operations of the mobile terminal 100. FIG. 8 mainly shows processes by the motion acceleration detection unit 1026.

The motion acceleration detection unit 1026 activates a motion acceleration detection timer (step S802). For the motion/stillness determination process shown in FIG. 5, the motion acceleration detection timer is configured so that the motion acceleration detection timer is activated at every time period $T_1$, subsequent to the start of the motion/stillness determination process.

The motion acceleration detection unit 1026 obtains the acceleration information (step S804). The motion acceleration detection unit 1026 retrieves the acceleration information from the sensor 114. The A-CPU causes the motion acceleration detection unit 1026 to retrieve the acceleration information from the sensor 114 by transferring to the active. For example, the A-CPU may transitions to an active mode in a short time period of approximately one second, and thereby the A-CPU may cause the motion acceleration detection unit 1026 to retrieve the acceleration information from the sensor 114. Subsequent to the retrieval of the acceleration information, the A-CPU may transitions to a sleep mode.

The motion acceleration detection unit 1026 determines the motion acceleration (step S806). The motion acceleration detection unit 1026 determines whether the motion acceleration is detected, based on the acceleration information retrieved from the sensor 114.

The motion acceleration detection unit 1026 records the determination result of whether the motion acceleration is detected in the motion acceleration management table (step S808).

The processes of steps S802-S808 are performed by the CPU 102, where the CPU 102 performs the processes in accordance with the motion/stillness determination program. The motion/stillness determination program is provided in a state where the motion/stillness determination program is recorded in a recording medium, such as a flexible disk, a CD-ROM, or a memory card. Further, the program may be downloaded through the communication network 300. When the recording medium is inserted into an auxiliary storage device of a computer, the program which is recorded in the recording medium is read out. The CPU 102 writes the read program in a RAM or in a HDD, and performs the processes. The program causes the computer to execute steps S802-S808 of FIG. 8. Further, for example, the program may cause the computer to execute at least a portion of the steps.

<Motion/Stillness Determination Process>

Figure 9:
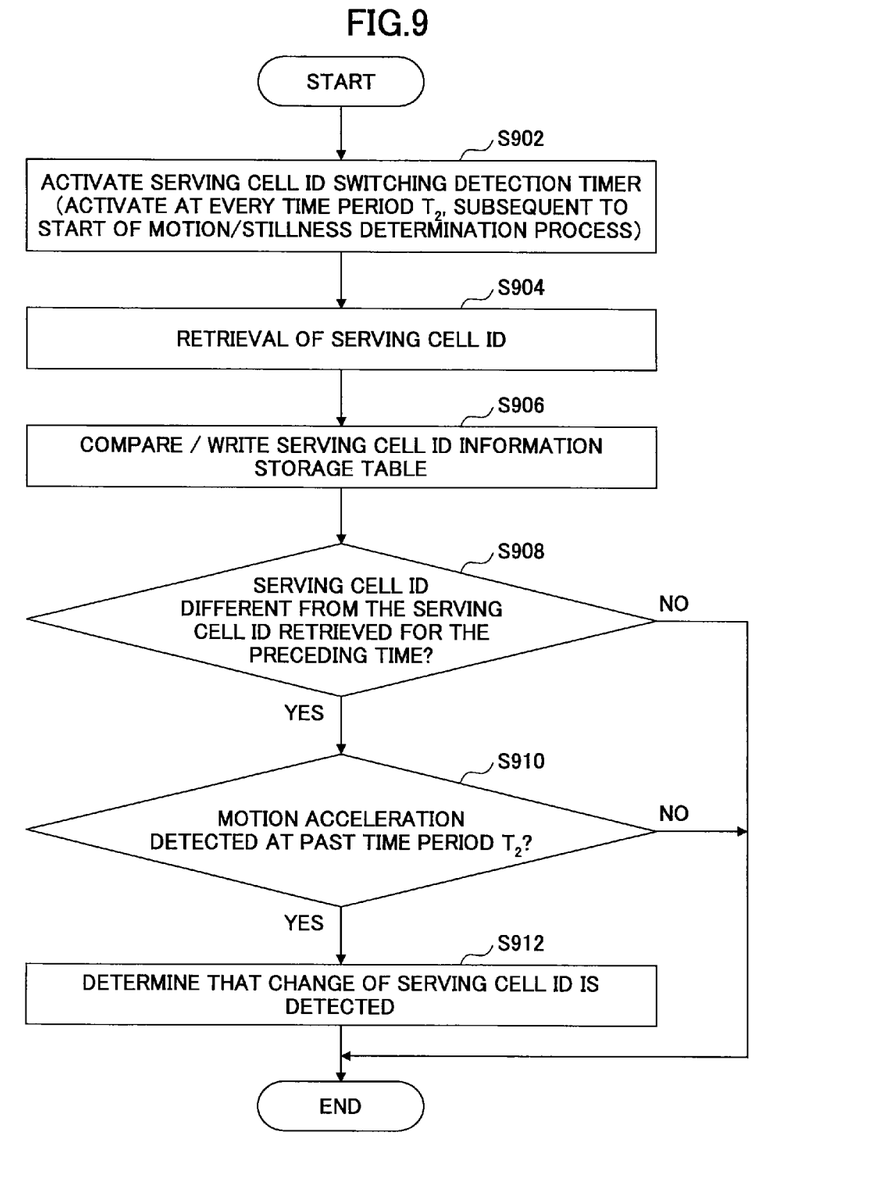
FIG. 9 is a flowchart showing one embodiment of operations of the mobile terminal (version 2).

FIG. 9 shows one embodiment of operations of the mobile terminal 100. FIG. 9 mainly shows processes by the serving cell ID switching detection unit 1024 and processes by the motion/stillness determination unit 1028.

The motion/stillness determination unit 1028 activates a serving cell ID switching detection timer (step S902). For the motion/stillness determination process shown in FIG. 5, the serving cell ID switching detection timer is configured so that the serving cell ID switching detection timer is activated at every time period $T_2$, subsequent to the start of the motion/stillness determination process.

The serving cell ID switching detection unit 1024 retrieves the serving cell ID (step S904).

The serving cell ID switching detection unit 1024 determines whether the serving cell ID which is retrieved at step S904 is included in the serving cell IDs stored in the serving cell ID information storage table by comparison. The serving cell ID switching detection unit 1024 updates the serving cell ID by writing it in the serving cell ID information storage table (step S906).

The serving cell ID switching detection unit 1024 determines whether the serving cell ID which is retrieved at step S904 is different from the serving cell IDs which have been retrieved until the preceding time (step S908).

When the serving cell ID which is retrieved at step S904 is determined not to be different from the serving cell IDs which have been retrieved until the preceding time (step S908: NO), the process terminates. In this case, the mobile terminal 100 is determined to be stationary.

When the serving cell ID which is retrieved at step S904 is determined to be different from the serving cell IDs which have been retrieved until the preceding time (step S908: YES), the motion/stillness determination unit 1028 determines whether the motion acceleration is detected in the past time period $T_1$. Namely, it is determined as to whether the motion acceleration is detected in an interval from the preceding motion/stillness determination process to the time period $T_2$.

When it is not determined that the motion acceleration is detected at the past time period $T_2$, the process terminates. In this case, the mobile terminal 100 is determined to be stationary.

When a determination is made that the motion acceleration is detected at the past time period $T_2$ (step S910: YES), the motion/stillness determination unit 1028 determines that the serving cell ID is changed (step S912). In this case, the mobile station 100 is determined to be moving.

The processes of steps S902-S912 are performed by the CPU 102, where the CPU 102 performs the processes in accordance with the motion/stillness determination program. The motion/stillness determination program is provided in a state where the program is recorded in a recording medium, such as a flexible disk, a CD-ROM, or a memory card. Further, the program may be downloaded through the communication network 300. When the recording medium is input into an auxiliary storage unit of a computer, the program which is stored in the recording medium is read out. The CPU 102 writes the read program in a RAM or an HDD, and executes the process. The program causes the computer to execute steps S902-S912 of FIG. 9. Further, for example, the program may cause the computer to execute at least a portion of these steps.

According to the embodiment, when the serving sector ID and the acceleration are monitored, and when the serving sector ID which is retrieved for the preceding time is different from the serving sector ID, erroneous determinations of whether it is moving or stationary can be reduced by determining a likelihood of motion of the mobile terminal based on a variation in the acceleration. In this case, modifications of the hardware and the native software are not required. Namely, mounting of a sub-CPU is not required. That is because it can be executed by the acceleration sensor and the processing of the upper layer application.

Accordingly, by adding an upper layer application, the function to detect the switching of the serving cell can be achieved for an open platform terminal. With this function, electric power saving and high precision can be achieved.

Accordingly, by periodically performing the automatic positioning and by reporting the measured location to the service providing device of the service provider, a service can be received from the service provider.

For convenience of explanation, specific examples of numerical values are used in order to facilitate understanding of the invention. However, these numerical values are simply illustrative, and any other appropriate values may be used, except as indicated otherwise.

Hereinabove, the mobile terminal, the motion/stillness determination method, and the non-transitory computer readable storage medium are explained by the embodiments. However, the present invention is not limited to the above-described embodiment, and various modifications and improvements may be made within the scope of the present invention. For the convenience of explanation, the devices according to the embodiments of the present invention are explained by using functional block diagrams. However, these devices may be implemented in hardware, software, or combinations thereof.

The present application claims priority based on Japanese Patent Application No. 2011-153294, filed on Jul. 11, 2011, the entire contents of which are hereby incorporated by reference.

LIST OF REFERENCE SYMBOLS

100: Mobile terminal
102: CPU
1022: Serving cell information retrieving unit
1024: Serving cell ID switching detection unit
1026: Motion acceleration detection unit
1028: Motion/stillness determination unit
104: Storage unit
106: Input unit
108: Output unit
110: Communication unit
112: GPS receiver
114: Sensor
150: Bus
$200_m$ (m is an integer such that m>0): Base station
300: Communication network
400: Service providing device
$500_n$ (n is an integer such that n>3): GPS satellites

The invention claimed is:

1. A mobile terminal configured to determine whether the mobile terminal is moving or stationary, the mobile terminal comprising:
    circuitry configured to
        detect motion acceleration at every first period based on acceleration information of the mobile terminal;
        retrieve information representing a serving cell;
        determine, at every second period, which is greater than the first period, whether the serving cell is switched based on the retrieved information representing the serving cell; and
        determine, when it is determined that the serving cell is switched, whether the mobile terminal is moved, based on whether the motion acceleration is detected, subsequent to a preceding process of determining whether the serving cell is switched.

2. The mobile terminal according to claim 1, wherein
    the circuitry is configured to determine that the mobile terminal is moved when it is determined that the serving cell is switched, and when motion acceleration is detected subsequent to determining whether the serving cell is switched.

3. A motion/stillness determination method of a mobile terminal configured to determine whether the mobile terminal is moving or stationary, the method comprising:
    a motion acceleration detection step of detecting motion acceleration at every first period based on acceleration information of the mobile terminal;
    a serving cell information retrieving step of retrieving information representing a serving cell;
    a serving cell information switching determination step of determining, at every second period, which is greater than the first period, whether the serving cell is switched based on the information representing the serving cell retrieved by the serving cell information retrieving step; and
    a motion/stillness determination step of determining, when the serving cell information switching determination step determines that the serving cell is switched, whether the mobile terminal is moved, based on whether the motion acceleration is detected by the motion acceleration detection step, subsequent to a preceding process of determining whether the serving cell is switched.

4. A non-transitory computer readable storage medium that stores a program which causes a computer to execute a motion/stillness determination method of a mobile terminal that determines whether the mobile terminal is moving or stationary, the method comprising:
    a motion acceleration detection step of detecting motion acceleration at every first period based on acceleration information of the mobile terminal;
    a serving cell information retrieving step of retrieving information representing a serving cell;
    a serving cell information switching determination step of determining, at every second period, which is greater than the first period, whether the serving cell is switched based on the information representing the serving cell retrieved by the serving cell information retrieving step; and
    a motion/stillness determination step of determining, when the serving cell information switching determination step determines that the serving cell is switched, whether the mobile terminal is moved, based on whether the motion acceleration is detected by the motion acceleration detection step, subsequent to a preceding process of determining whether the serving cell is switched.

* * * * *